United States Patent
Seaman et al.

(10) Patent No.: US 10,628,782 B2
(45) Date of Patent: Apr. 21, 2020

(54) DETERMINING WHETHER A VEHICLE IS ABLE TO TRANSFER A CARGO TRANSPORTATION UNIT

(71) Applicant: BlackBerry Limited, Waterloo (CA)

(72) Inventors: Conrad Delbert Seaman, Ottawa (CA); Kristian Neil Spriggs, Ottawa (CA); Stephen West, Manotick (CA)

(73) Assignee: BlackBerry Limited, Waterloo, Ontario (CA)

( * ) Notice: Subject to any disclaimer, the term of this patent is extended or adjusted under 35 U.S.C. 154(b) by 422 days.

(21) Appl. No.: 15/467,595

(22) Filed: Mar. 23, 2017

(65) Prior Publication Data

US 2018/0276609 A1   Sep. 27, 2018

(51) Int. Cl.
*G06Q 10/08* (2012.01)

(52) U.S. Cl.
CPC .................................. *G06Q 10/0832* (2013.01)

(58) Field of Classification Search
CPC .... G06Q 10/0832; G06Q 10/08; G06Q 50/30; G06Q 10/0833; G06Q 10/087; G06Q 10/083; G06Q 10/08355; G06Q 20/4016; G06Q 50/28; G06Q 10/063114; G06Q 10/06398; G06Q 10/0835
See application file for complete search history.

(56) References Cited

U.S. PATENT DOCUMENTS

| | | | |
|---|---|---|---|
| 3,412,876 A | 11/1968 | Calabrese | |
| 4,780,043 A | 10/1988 | Fenner et al. | |
| 5,015,145 A | 5/1991 | Angell et al. | |
| 5,987,377 A | 11/1999 | Westerlage et al. | |
| 6,290,277 B1 | 9/2001 | Spykerman et al. | |
| 8,123,281 B2 | 2/2012 | Perkins et al. | |
| 9,561,941 B1 | 2/2017 | Watts | |
| 10,248,120 B1* | 4/2019 | Siegel | G01C 21/3602 |
| 2004/0069850 A1 | 4/2004 | De Wilde | |
| 2005/0232747 A1* | 10/2005 | Brackmann | B60P 3/03 414/803 |
| 2007/0021864 A1 | 1/2007 | Mountz et al. | |
| 2011/0084162 A1 | 4/2011 | Goossen et al. | |
| 2013/0096713 A1 | 4/2013 | Takizawa et al. | |
| 2014/0214196 A1 | 7/2014 | Worsley | |
| 2015/0349917 A1* | 12/2015 | Skaaksrud | H04B 17/3913 370/328 |

(Continued)

FOREIGN PATENT DOCUMENTS

WO    2016/014917 A1    1/2016

OTHER PUBLICATIONS

Sousa et. al., "Management Framework for Used Cooking Oil Collection," Mar. 11, 2013, Interciencia, vol. 38, No. 3, pp. 202-208 (Year: 2013).*

(Continued)

*Primary Examiner* — Kevin H Flynn
*Assistant Examiner* — Michelle E Carey
(74) *Attorney, Agent, or Firm* — Trop, Pruner & Hu, P.C.

(57) ABSTRACT

In some examples, a vehicle includes a controller configured to receive information of a characteristic relating to transport of a cargo transportation unit (CTU), the information sent by the CTU, and determine, based on the received information, whether the vehicle is able to transfer the CTU to a destination of the CTU.

22 Claims, 4 Drawing Sheets

(56) References Cited

U.S. PATENT DOCUMENTS

| | | | | |
|---|---|---|---|---|
| 2016/0019497 A1* | 1/2016 | Carvajal | ............... | G06Q 10/08 |
| | | | | 701/519 |
| 2017/0349166 A1* | 12/2017 | Anderson | ............ | B60W 30/02 |
| 2018/0060827 A1* | 3/2018 | Abbas | .................. | G05D 1/0088 |

OTHER PUBLICATIONS www.autoflexsuspensions.com/autotlex/—Auto Flex—Air Ride Suspension System dated on or before Nov. 13, 2016 (2 pages).
VSE—Dynamic Truck and Trailer Suspension DTS Suspension, Advanced Steering & Suspension Solutions, Version 2009 (24 pages).
www.kudauk.ltd.uk/shop/truck-aerodynamics/lasereye-auto-spoiler-adjustment—LaserEye, Automatic Truck Spoiler, Roof Deflector Adjustment System dated on or before Nov. 13, 2016 (7 pages).
www.psitireinflation.com/how-atis-works—P.S.I. The Inflation System—How Automatic Tire Inflation Systems Work, 2015 (2 pages).
www.truckingefficiency.org/tire-pressure-inflation-trailer—Tire Pressure Inflation Systems (Trailers) dated on or before Nov. 13, 2016 (11 pages).
Dronelife News, 5 Reasons Drones Will Change the Future of Cargo, Aug. 11, 2014 (9 pages).
Insurance Journal, First Licensed Autonomous Freight Truck Hits the Road in U.S., May 6, 2015 (8 pages).
Petersen, Ryan, Crunch Network, The driverless truck is coming, and it's going to automate millions of jobs, Apr. 25, 2016 (12 pages).
www.platformuca.org/—The Platform for Unmanned Cargo Aircraft (PUCA), 2016 (2 pages).
Seaman et al., U.S. Appl. No. 15/388,491 entitled Controlling Access to Compartments of a Cargo Transportation Unit filed Dec. 22, 2016 (32 pages).
Seaman et al., U.S. Appl. No. 15/254,654 entitled Improving Efficiency of a Cargo Shipping System filed Sep. 1, 2016 (51 pages).
Seaman et al., U.S. Appl. No. 15/388,479 entitled Adjusting Mechanical Elements of Cargo Transportation Units filed Dec. 22, 2016 (31 pages).
ISA/CA, International Search Report and Written Opinion for PCT/CA2018/050302 dated May 31, 2018 (8 pages).
European Patent Office, Extended European Search Report for Appl. No. 18770757.5 dated Nov. 26, 2019 (10 pages).

* cited by examiner

DETERMINING WHETHER A VEHICLE IS ABLE TO TRANSFER A CARGO TRANSPORTATION UNIT

BACKGROUND

Trucks, tractor-trailers, or tractors that are connected to chassis for carrying containers can be used to transport cargo that includes goods. Cargo can be transported from an origin (such as a factory, a warehouse, a retail outlet, etc.) to a destination (such as retail outlet, a warehouse, customer premises, etc.) along a route. In some cases, a vehicle, such as a truck or tractor, to haul trailers or other cargo transportation units may not be properly matched to the trailers or other cargo transportation units.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A cargo transportation unit (CTU) in the form of a moveable platform can be used to carry cargo items between different geographic locations. A "cargo item" can refer to any physical item that is to be delivered from one location to another location. "Cargo" can refer to one or more cargo items. In some examples, a CTU can be a container (that is attached to a tractor), a cargo carrying portion of a truck, or a trailer, where the container provides an enclosed space in which the physical items can be stored during shipment. In other examples, the CTU can include another type of carrier structure that is able to carry cargo items. More generally, the CTU can be part of, mounted on, or attached, as applicable, to a vehicle, such as a truck, a trailer, a tractor, a car, a railed vehicle (e.g., a train), a watercraft (e.g., a ship), an aircraft, a spacecraft, and so forth. The vehicle can haul the CTU that is part of, mounted on, or attached to the vehicle.

In some examples, a vehicle to which a CTU is attached to, mounted on, or part of, can be a driverless vehicle that can be self-driving. A driverless vehicle (also referred to as an "autonomous vehicle") refers to a vehicle that is without a driver, i.e., a human that controls the movement of the vehicle while the driver is located on the vehicle. A self-driving or autonomous vehicle has the intelligence and self-awareness to perform driving tasks, including driving itself from an origin to a destination, without any human driver on the vehicle.

Traditionally, when a vehicle that hauls a CTU is driven by a human driver, the human driver can perform various tasks, including ensuring physical safety of the CTU, determining when maintenance of the CTU is to be performed, and ensuring a good match between the vehicle and the CTU (e.g., such as selecting a tractor with sufficient towing capacity to pull a CTU that carries cargo). When replacing a vehicle driven by a human driver with an autonomous vehicle, then not only is the human driver replaced, but further various ancillary tasks of the human driver are also being replaced.

In accordance with some implementations of the present disclosure, solutions are provided to allow an exchange of information between a CTU and a vehicle to ensure that the vehicle and the CTU are properly matched for the vehicle to transfer the CTU to a destination. A vehicle "transferring" a CTU can refer to the vehicle towing the CTU, the vehicle carrying the CTU (such as the CTU being mounted on a bed or other support structure of the CTU), or the vehicle otherwise attached to or mounted with a CTU for the purpose of moving the CTU from a first location to a second location.

Figure 1:
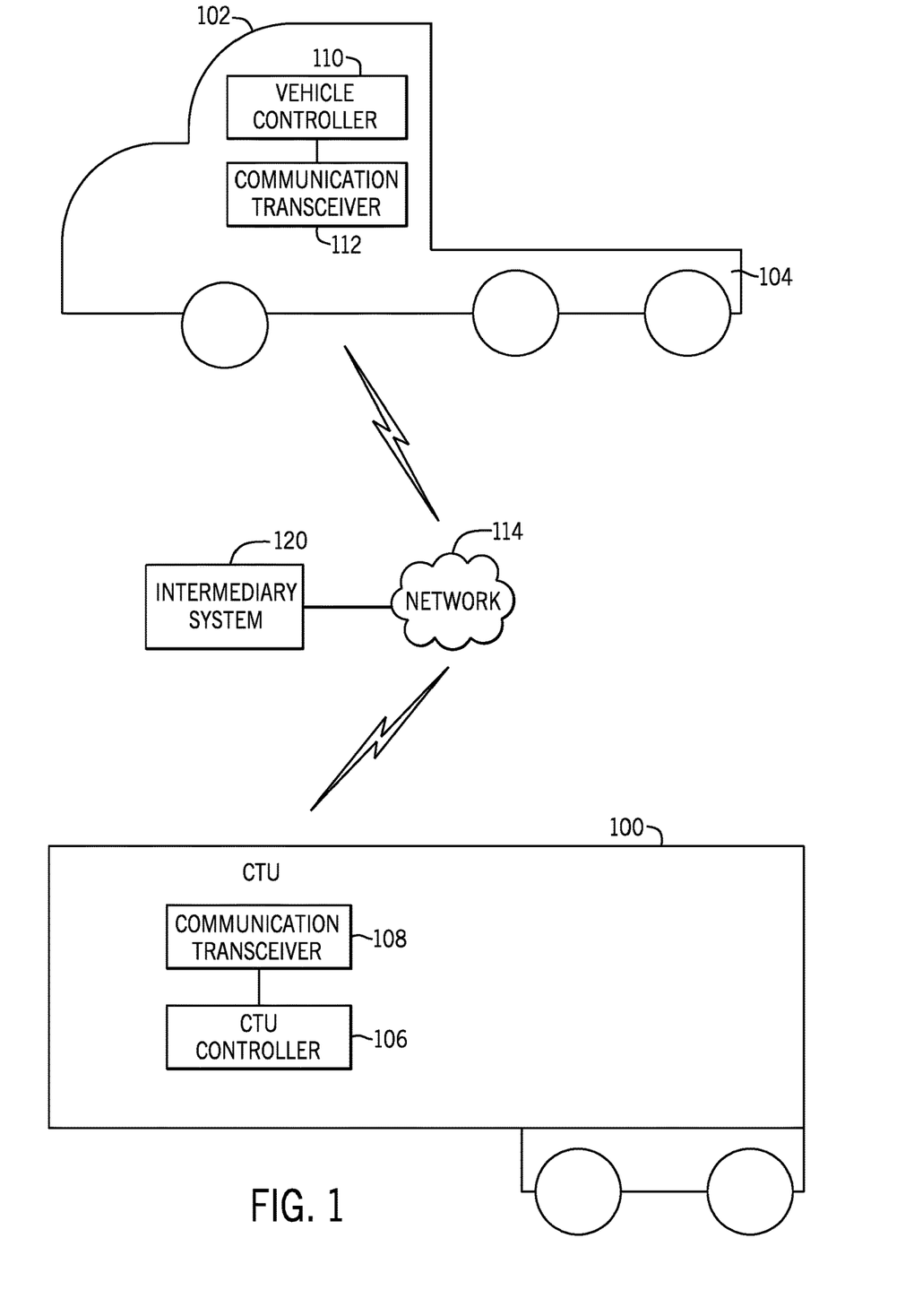
FIG. 1 is a block diagram of an example arrangement including a cargo transportation unit (CTU) and a vehicle, according to some implementations.

FIG. 1 is a block diagram of an example arrangement that includes a CTU 100 and a vehicle 102 (such as a tractor or other type of vehicle). In some examples, the CTU 100 can be attached to a tow platform 104 of the vehicle 102, to allow the vehicle 102 to tow the CTU 100 to different locations. In other examples, the vehicle 102 can be provided with a mounting bed or other support structure on which the CTU 100 can be placed. In such latter examples, the vehicle 102 can be a truck or any other vehicle on which the CTU 100 can be mounted.

The CTU 100 includes a CTU controller 106 that is coupled to a communication transceiver 108 of the CTU 100. The vehicle includes a vehicle controller 110 that is coupled to a communication transceiver 112 of the vehicle 102. As used here a "controller" can refer to a hardware processing circuit that can include any one or more of the following: a microprocessor, a core of a multi-core microprocessor, a microcontroller, a programmable gate array, a programmable integrated circuit device, or another type of hardware processing circuit. In further examples, a controller can include a combination of a hardware processing circuit and machine-readable instructions (software or firmware) executable on the hardware processing circuit.

In some examples, the vehicle 102 is an autonomous vehicle without a human driver. In further examples, the vehicle 102 is driven by a human driver, but has the vehicle controller 110.

The communication transceivers 108 and 112 are able to perform communications over a network 114. In some examples, the network 114 can be a wireless network, and the communication transceivers 108 and 112 are wireless transceivers that are able to communicate wirelessly over the network 114. For example, the communication transceivers 108 and 112 can perform radio frequency (RF) communications, such as over a cellular access network, a wireless local area network (WLAN), or any other type of wireless network. In further examples, the communication transceivers 108 and 112 can perform peer-to-peer wireless communications directly with each other, such as over a wireless link between the communication transceivers 108 and 112. Examples of such direct wireless communications can include Wi-Fi Direct communications, Bluetooth communications, and so forth.

The vehicle 102 and the CTU 100 can be located relatively far apart, such as at disparate geographic locations, in some examples, while still being able to communicate over the network 114. In further examples, the CTU 100 and the vehicle 102 can be in close proximity with each other when communicating.

Although reference is made to wireless communications between the CTU 100 and the vehicle 102, it is noted that in some cases, the CTU 100 and the vehicle 102 can perform wired communications, such as when the CTU 100 and the vehicle 102 are both connected by a wired link to the network 114.

The ability of the CTU controller 106 being able to communicate with the vehicle controller 110 allows for a determination of whether the vehicle 102 is a match for the CTU 100, based on information of a characteristic relating to transport of the CTU 100. Such information of the characteristic relating to transport of the CTU 100 can include a requirement of the CTU 100 (such as a requirement relating to characteristics of the vehicle 102, the CTU 100, or cargo carried by the CTU 100), restrictions associated with the CTU 100, a condition relating to travel of the CTU 100, and so forth.

In some examples, communications can occur between a CTU and a vehicle without passing through an intermediary system. In other examples, communications between a CTU and a vehicle can pass through an intermediary system 120. The intermediary system 120 can be a server (implemented with one or more computers) that the CTU 100 and the vehicle 102 can communicate with. In such examples, communications are routed through the intermediary system 120. For example, the CTU 100 can send a request for pickup by a vehicle to the intermediary system 120, and the intermediary system 120 can forward the request to one or more vehicles.

Figure 2:
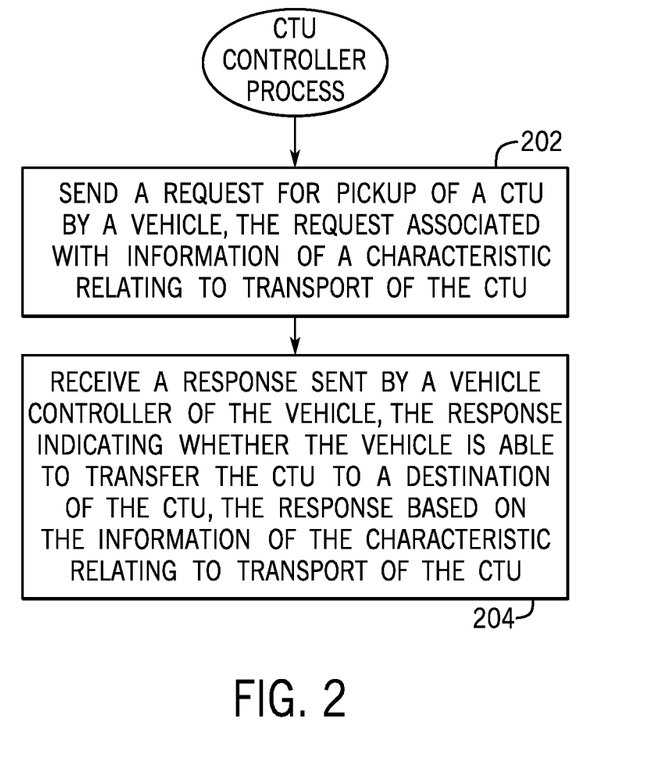
FIG. 2 is a flow diagram of an example process of a CTU controller, according to some implementations

FIG. 2 is a flow diagram of a process that can be performed by the CTU controller 106 according to some examples. The CTU controller 106 sends (at 202) a request for pickup of a CTU by a vehicle, such as the vehicle 102. The request can be transmitted to a specific vehicle, or can be broadcast or multicast to a number of vehicles (such as by sending the request to a broadcast address or multicast address). In the latter example, any vehicle associated with the broadcast or multicast address would receive the request, such as over the network 114 of FIG. 1. To target the request to a given vehicle, the request can be sent to a unicast address of the given vehicle.

In other examples, instead of sending the request to a vehicle or a group of vehicles, the request can instead be sent to an intermediary system (such as 120 in FIG. 1), which in turn would forward the request to one or more vehicles (such as vehicle(s) that have registered with the intermediary system 120). Note that "forwarding" the request can refer to the intermediary system 120 sending the content of the request in a message to the vehicle controller 110.

The request sent by the CTU controller 106 is associated with information of a characteristic relating to transport of the CTU 100. In some examples, the information of the characteristic relating to transport of the CTU can be carried in the request or can be referred to (such as by a pointer in) the request. The information can include any one or some combination of the following: information relating to a characteristic of cargo carried by the CTU 100, information relating to a physical parameter of the CTU 100, a target characteristic of a vehicle that is to transfer the CTU 100, information of a condition relating to travel of the CTU 100, and so forth. A characteristic of cargo can include a hazard rating of the cargo, a temperature or humidity level at which the cargo is to be maintained, and so forth (further examples provided below). A physical parameter of the CTU can include a weight of the CTU, a size of the CTU, and so forth (further examples provided below). A target characteristic of a vehicle can include a speed of the vehicle, a pull rating of the vehicle, and so forth (further examples provided below). A condition relating to travel of the CTU can include a speed of travel, an urgency of delivery of cargo carried by the CTU, and so forth (further examples provided below).

The CTU controller 106 receives (at 202) a response sent by a vehicle controller (e.g., 110 in FIG. 1) that is part of the vehicle, the response indicating whether the vehicle is able to transfer the CTU 100 to a destination of the CTU 100, the response being based on the information of the characteristic relating to transport of the CTU 100. The response received by the CTU controller 106 may have been transmitted by the vehicle controller 110 over the network 114 for receipt by the CTU controller 106. For example, the response can include a destination address of the CTU controller 106.

In other examples, the response sent by the vehicle controller 110 can be received by the intermediary system 120, which in turn forwards the response to the CTU controller 106. Note that "forwarding" the response can refer to the intermediary system 120 sending the content of the response in a message to the CTU controller 106.

Figure 3:
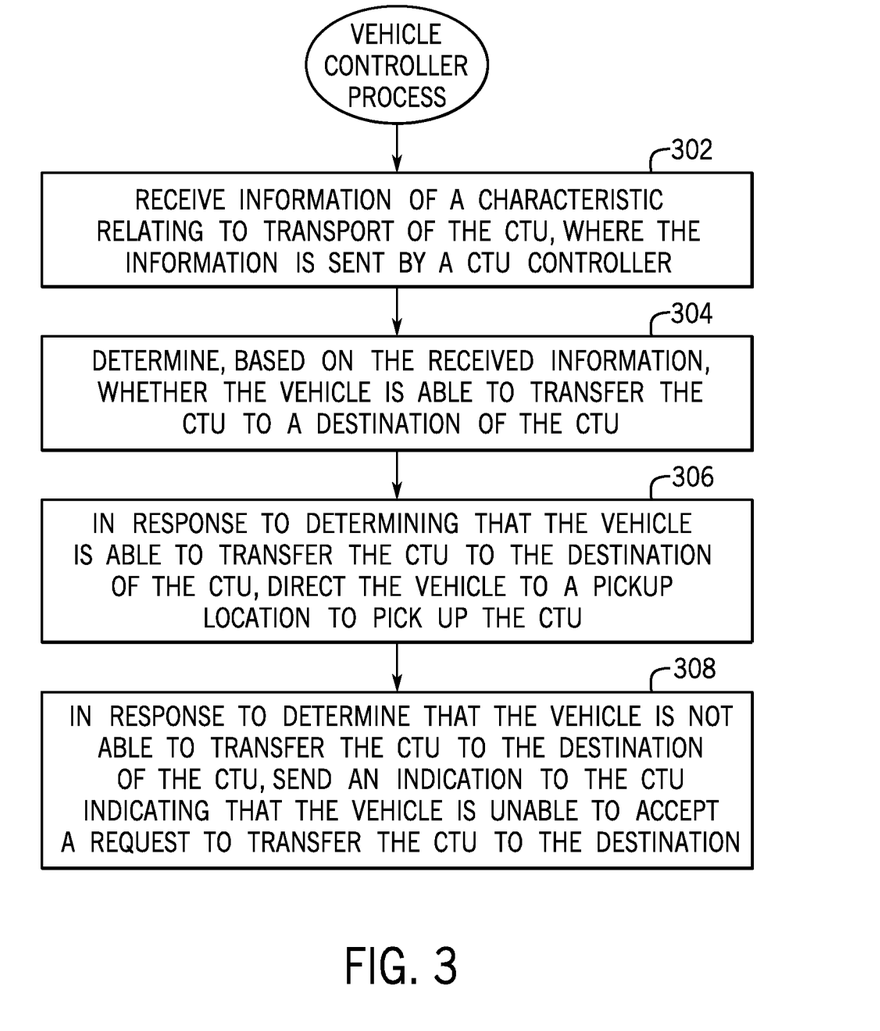
FIG. 3 is a flow diagram of an example process of a vehicle controller, according to further implementations.

FIG. 3 is a flow diagram of an example process that can be performed by the vehicle controller 110 according to some examples. The vehicle controller 110 receives (at 302) information of a characteristic relating to transport of the CTU, where the information is sent by a CTU controller (e.g., 106 in FIG. 1). For example, the information relating to transport of the CTU may be included in a request sent by the CTU controller 106, where the request may be targeted to the vehicle controller 110 (such as to a unicast address or broadcast/multicast address of the vehicle controller 110). In other examples, the information may be sent by the CTU controller 106 to an intermediary system (e.g., 120 in FIG. 1), which then forwards the information to the vehicle controller 110.

The vehicle controller 110 determines (at 304), based on the received information, whether the vehicle 102 is able to transfer the CTU to a destination of the CTU.

In response to determining that the vehicle 102 is able to transfer the CTU to the destination of the CTU, the vehicle controller 110 is to direct (at 306) the vehicle 102 to a pickup location to pick up the CTU. The pickup location may be specified in a request sent by the CTU, or alternatively, the pickup location can be based on a further exchange of information between the vehicle controller 110 and the CTU controller 106 in the CTU.

In response to determining that the vehicle 102 is not able to transfer the CTU to the destination of the CTU, the vehicle controller 110 is to send (at 308) an indication to the CTU indicating that the vehicle is unable to accept a request to transfer the CTU to the destination. The indication can be sent to the address of the CTU controller 106, or alternatively, the indication can be sent to an intermediary system which then forwards the indication to the CTU controller 106.

In some examples, multiple vehicles can receive a request from a CTU controller of a CTU, where the request can include information of a characteristic relating to transport of the CTU. Each of such multiple vehicles can respond to the request. In some examples, the first vehicle to accept the request will be the vehicle that transports the CTU.

In further examples, the closest vehicle (the vehicle closest to the CTU) that is able to accept the request will be the vehicle that transports the CTU. For example, the intermediary system 120 of FIG. 1 can determine which of the vehicles are closest, and can select the vehicle that is closest and that is able to accept the request as the vehicle to transport the CTU.

As noted above, there are various different types of information of a characteristic relating to transport of a CTU, including information relating to a characteristic of cargo carried by the CTU, information relating to a physical parameter of the CTU, a target characteristic of a vehicle that is to transfer the CTU, information of a condition relating to travel of the CTU, and so forth.

The following are examples of information relating to a characteristic of cargo carried by a CTU. Examples of characteristics of cargo can include any or some combination of the following: a hazard rating of the cargo (i.e., whether the cargo is dangerous or not), a temperature or humidity level at which the cargo is to be maintained (e.g., the cargo is to be heated at above a specified temperature, the cargo is to be cooled or frozen at the lowest specified temperature), a weight of the cargo, a form of the cargo (e.g., whether the cargo is in the form of a solid, a gas, or a liquid), a perishable characteristic of the cargo (e.g., whether the cargo includes food items or other items that can perish after some specified time duration or at a temperature above a threshold or below a threshold), a fragility of the cargo (e.g., whether the cargo is easily broken), a sensitivity of the cargo (e.g., sensitivity to temperature, sensitivity to light, sensitivity to humidity, etc.), a value of the cargo for security purposes, a size of the cargo in dimensional units like centimeters or inches, or other characteristics of cargo.

Some vehicles may be rated to carry cargo having specific characteristics. For example, a first type of cargo may be fragile (e.g., a load of glass bottles), while a second type of cargo may not be fragile (e.g., a container full of sand). To carry fragile cargo, a vehicle with a softer suspension (e.g., one that has a gas/air suspension) may be selected, or a vehicle that is able to travel at a lower speed can be selected, and so forth. Alternatively, a vehicle with the ability to adjust to the softer suspension, or can adjust to a range of suspension settings compatible with the cargo, may be selected. If a request for transfer of the CTU specifies that the cargo is fragile, then the vehicle can reject the request if the vehicle does not have the ability to transfer fragile cargo (e.g., the vehicle has a stiff suspension that can cause large forces that can damage the fragile cargo).

To carry the less fragile container of sand, it may not matter what type of vehicle is used, so that any vehicle can be selected. As another example, if the cargo is perishable after some period of time, then a vehicle can be selected that is able to transfer the CTU at a higher speed, so that it is more likely that the CTU can be transported to its destination at a specified time before the cargo perishes. Thus, for example, in response to a request to transfer the CTU that specifies that the cargo contained in the CTU is perishable after a certain amount of time, the vehicle can reject the request if the vehicle determines that the vehicle is unable to travel at a high enough speed to reach the destination fast enough. Alternatively, the vehicle may reject the request if the vehicle determines that it has been a while since the vehicle was last maintained or serviced, so that there is a higher likelihood that the vehicle may break down, which can cause perishable cargo to expire if the vehicle is broken down for an extended period of time.

The following includes examples of information relating to a physical parameter of the CTU. The physical parameter of the CTU can include any or some combination of the following: a weight of the CTU, a size of the CTU, a type of the CTU, a load status of the CTU, an operational status of the CTU, availability of a regulatory certification for the CTU, or other parameter. A CTU that has a certain weight or a certain size can dictate the use of a vehicle that is able to transfer the CTU of the specific weight and/or size. For example, the vehicle may have to have a certain pull rating, a certain tire size, or a certain tire pressure to be able to tow or carry the CTU having the specified weight and/or size. A type of the CTU can specify whether the CTU can be towed by a tow hitch mechanism of the vehicle, or whether the CTU has to be mounted onto a bed or other support structure on the vehicle. Moreover, the type of CTU can specify a specific type of hitch mechanism to use for the CTU.

A load status of the CTU can indicate whether or not the vehicle is likely to make one or more stops to pick up additional cargo before heading to the destination (or destinations). If the CTU is relatively empty, then that increases the likelihood that the vehicle would have to stop at more pickup locations to pick up additional cargo. This may mean that the vehicle may spend a longer period of time transferring the CTU to its destination (or multiple destinations). If the vehicle is available for only a specified time duration that is less than the overall amount of time expected to transfer the CTU (with the multiple stops to pick up additional cargo), then the vehicle may not be a candidate to transfer the CTU and thus can reject the request to transfer the CTU.

The operational status of the CTU can indicate whether or not components of the CTU are operating properly, where the components can include a tire of the CTU, a brake of the CTU, a suspension of the CTU, an aerodynamic shroud of the CTU, and so forth. If the tire of the CTU is under-pressurized, the brake of the CTU is not working properly, or the aerodynamic shroud of the CTU is not operating properly, then the vehicle may decide to reject the request to transfer the CTU, since the vehicle can determine that it is not safe or may be inefficient to transfer the CTU with components that are not in optimal conditions.

An example of availability of a regulatory certification for the CTU can include whether or not the CTU has a certificate that allows the CTU to be operated in a specific jurisdiction, such as in a specific country, a specific state, and so forth. Without the specified certificate, the vehicle may deny the request to transfer the request if the request calls for the CTU to be transported through a jurisdiction for which the CTU does not have the specified certificate.

Another characteristic relating to transport of the CTU includes a target characteristic of the vehicle. The target characteristic can be specified by the CTU controller 106 to indicate a specific characteristic (or characteristics) of the vehicle desired by the CTU controller 106 for transferring the CTU. As examples, the target characteristic of the vehicle can include any one or some combination of the following: a speed of the vehicle, a pull rating of the vehicle (e.g., the amount of weight that the vehicle can tow), a tire size of the vehicle, a tire pressure of the vehicle, a distance range of the vehicle, a brake capacity of the vehicle (how quickly the vehicle is able to stop when carrying a particular load), a type of suspension (e.g., air suspension versus spring suspension) used by the vehicle, a security feature of the vehicle, a sealing capability of the vehicle, a performance rating of the vehicle or a driver of the vehicle, compliance of the vehicle with a government standard, and a type of available attachment mechanism on the vehicle to attach to the CTU, certifications or inspection information related to the vehicle.

For example, the CTU can carry cargo that may have to be transported over a certain distance; if the vehicle does not have the distance range to travel over that distance, then the vehicle would have to deny the request to transfer the CTU. As another example, the CTU can specify a maximum speed of the vehicle, such as in situations where the CTU is carrying fragile cargo. A vehicle that is unable or unwilling to satisfy that maximum speed would have to deny the request to transfer the CTU.

A security feature of the vehicle can include whether or not the vehicle is able to detect intrusion into the vehicle and/or the CTU, and to send an alert in case of intrusion. Another security feature of the vehicle is whether the vehicle is able to control locking of the CTU, or compartments in the CTU that carry cargo.

A sealing capability can refer to whether the vehicle can control sealing of the CTU, such that the cargo carried by the CTU is in a sealed environment (e.g., to prevent moisture from entering the CTU). This may be important where the cargo that is carried is perishable. The sealing capability can also be used in a context where the CTU includes a refrigeration unit or a heating unit in which cargo items can be placed; the sealing capability can provide environmental control for the refrigeration unit or a heating unit.

The performance rating of the vehicle or driver of the vehicle can refer to prior ratings of the vehicle or driver of the vehicle, where the ratings may have been provided by a third party to indicate how safe the vehicle has been operated in the past, for example.

The type of available attachment mechanism on the vehicle can refer to a hitch mechanism or other attachment mechanism.

As further noted above, the characteristic relating to transport of the CTU can further include information of a condition relating to travel of the CTU. For example, the condition relating to travel of the CTU can include any one or some combination of the following: a speed of travel, an urgency of delivery of cargo carried by the CTU, a delivery time for cargo of the CTU, a planned route of the CTU, and a specification that stopping is prohibited. Thus, if the CTU is unable to meet the specified speed of travel, is unable to deliver the cargo by a specified deadline, or does not wish to travel over a planned route or is unable to satisfy the specification that stopping is prohibited, then the vehicle can reject the request to transfer the CTU. As used here, "stopping" can refer to a condition of the vehicle where the vehicle is planning to stop for an extended period of time, which exceeds a specified time threshold. Stopping of the vehicle does not include temporarily stopping at a traffic light, at a stop sign, or to perform weight or other safety checks by authorities.

Figure 4:
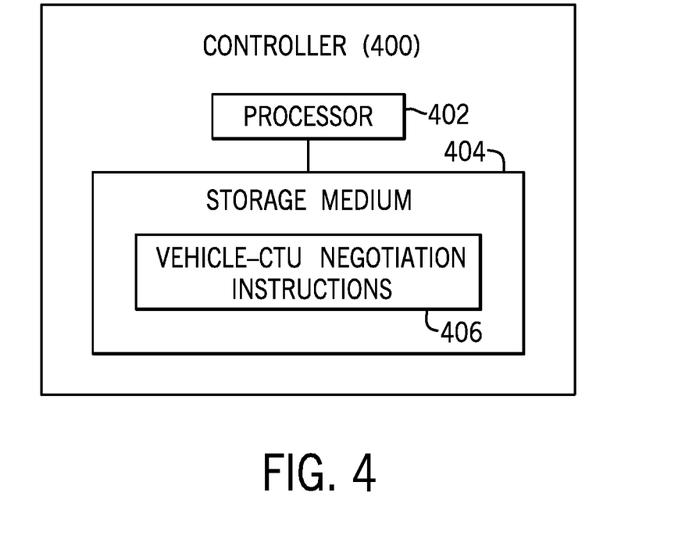
FIG. 4 is a block diagram of a controller according to some implementations.

FIG. 4 is a block diagram of a controller 400, which can be the CTU controller 106 or vehicle controller 110 of FIG. 1. The controller 400 includes a processor 402 (or multiple processors). A processor can include a microprocessor, a core of a multi-core microprocessor, a microcontroller, a programmable integrated circuit, a programmable gate array, or another hardware processing circuit.

The controller 400 further includes a non-transitory machine-readable or computer-readable storage medium storing machine-readable instructions that are executable on the processor 402 to perform specified tasks. The machine-readable instructions include vehicle-CTU negotiation instructions 404 that can perform the tasks of FIG. 2 or 3, for example.

The storage medium 404 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A vehicle comprising:
a support structure to attach to or mount a cargo transportation unit (CTU);
a communication transceiver to communicate over a network; and
a vehicle controller configured to:
receive, through the communication transceiver from the network, information of a physical parameter of the CTU, the information sent by the CTU;
determine, based on the information of the physical parameter of the CTU that is received through the communication transceiver from the network, whether the vehicle is able to transfer the CTU to a destination of the CTU;
in response to determining that the vehicle is able to transfer the CTU to the destination of the CTU, direct the vehicle to a pickup location to pick up the CTU; and
in response to determining that the vehicle is not able to transfer the CTU to the destination of the CTU, send an indication to a CTU controller of the CTU indicating that the vehicle is unable to accept a request to transfer the CTU to the destination.

2. The vehicle of claim 1, wherein the vehicle controller is configured to receive information of a characteristic of cargo carried by the CTU, wherein the determining of whether the vehicle is able to transfer the CTU to the destination of the CTU is further based on the information of the characteristic of the cargo.

3. The vehicle of claim 2, wherein the vehicle controller is configured to determine whether the vehicle has an ability to adjust an adjustable element of the vehicle, and wherein the determining of whether the vehicle is able to transfer the CTU to the destination of the CTU is further based on the determining of whether the vehicle has the ability to adjust the adjustable element of the vehicle.

4. The vehicle of claim 3, wherein the adjustable element comprises a suspension of the vehicle, and
wherein the determining of whether the vehicle is able to transfer the CTU to the destination of the CTU is further based on the determining of whether the vehicle has an ability to adjust the suspension of the vehicle.

5. The vehicle of claim 2, wherein the characteristic of the cargo carried by the CTU is selected from among a hazard rating of the cargo, a temperature level or humidity level at which the cargo is to be maintained, a weight of the cargo, a form of the cargo, a perishable characteristic of the cargo, a fragility of the cargo, a sensitivity of the cargo, a value of the cargo for security purposes, and a size of the cargo in dimensional units.

6. The vehicle of claim 2, wherein the vehicle controller is configured to determine whether the vehicle has an ability to control sealing of the CTU, and
wherein the determining of whether the vehicle is able to transfer the CTU to the destination of the CTU is further based on the determining of whether the vehicle has the ability to control the sealing of the CTU.

7. The vehicle of claim 2, wherein the vehicle controller is configured to determine whether the vehicle has an ability to detect intrusion into the vehicle or the CTU, and
wherein the determining of whether the vehicle is able to transfer the CTU to the destination of the CTU is further based on the determining of whether the vehicle has the ability to detect intrusion into the vehicle or the CTU.

8. The vehicle of claim 1, wherein the physical parameter of the CTU is selected from among a weight of the CTU, a size of the CTU, a type of the CTU, a load status of the CTU, an operational status of the CTU, and availability of a regulatory certification for the CTU.

9. The vehicle of claim 1, wherein the vehicle controller is configured to receive, from the CTU controller through the communication transceiver and the network, information of a target characteristic of the vehicle,
wherein the determining of whether the vehicle is able to transfer the CTU to the destination of the CTU is further based on the information of the target characteristic of the vehicle.

10. The vehicle of claim 9, wherein the target characteristic of the vehicle is selected from among a speed, a pull rating, a tire size, a tire pressure, a distance range, a brake capacity, a type of suspension, a security feature, a sealing capability, a performance rating of the vehicle or a driver of the vehicle, compliance of the vehicle with a government standard, and a type of available attachment mechanism on the vehicle to attach to a CTU.

11. The vehicle of claim 1, wherein the vehicle controller is configured to receive information of a condition relating to travel of the CTU,
wherein the determining of whether the vehicle is able to transfer the CTU to the destination of the CTU is further based on the information of the condition relating to travel of the CTU.

12. The vehicle of claim 11, wherein the condition relating to travel of the CTU is selected from among a speed of travel, an urgency of delivery of cargo by the CTU, a delivery time for cargo of the CTU, a planned route of the CTU, and a specification that stopping is prohibited.

13. The vehicle of claim 1, comprising an autonomous, driverless vehicle.

14. A cargo transportation unit (CTU) comprising:
a structure to attach to or mount on a support structure of a vehicle;
a communication transceiver to communicate over a network; and
a CTU controller configured to:
send, to a plurality of vehicles through the communication transceiver and over the network, a request for pickup of a CTU by a vehicle, the request associated with information of a characteristic relating to transport of the CTU;
receive, from the network and through the communication transceiver, responses sent by vehicle controllers that are part of respective vehicles of the plurality of vehicles, each respective response of the responses indicating whether the respective vehicle of the plurality of vehicles is able to transfer the CTU to a destination of the CTU, the respective response being based on the information of the characteristic relating to transport of the CTU; and
receive selection of a selected vehicle of the plurality of vehicles that is to transfer the CTU.

15. The CTU controller of claim 14, wherein the network is a wireless network, and wherein the request is to be sent over the wireless network for receipt by the vehicle controllers or by an intermediary system that forwards the request to the vehicle controllers.

16. The CTU controller of claim 14, wherein the information of the characteristic relating to transport of the CTU comprises information relating to a characteristic of cargo carried by the CTU.

17. The CTU controller of claim 14, wherein the information of the characteristic relating to transport of the CTU comprises information relating to a physical parameter of the CTU.

18. The CTU controller of claim 14, wherein the information of the characteristic relating to transport of the CTU comprises a condition relating to travel of the CTU.

19. The CTU controller of claim 14, wherein the information of the characteristic relating to transport of the CTU comprises information relating to a characteristic of the vehicle.

20. An autonomous vehicle comprising:
a support structure to attach to or mount a cargo transportation unit (CTU);
a communication transceiver to communicate over a wireless network; and
a vehicle controller configured to:
receive, through the communication transceiver from the wireless network, information of a physical parameter of the CTU, the information sent by a CTU controller of the CTU;
determine, based on the information of the physical parameter of the CTU that is received through the communication transceiver from the network, whether the autonomous vehicle is able to transfer the CTU to a destination of the CTU;
in response to determining that the autonomous vehicle is able to transfer the CTU to the destination of the CTU, direct the autonomous vehicle to a pickup location to pick up the CTU; and
in response to determining that the autonomous vehicle is not able to transfer the CTU to the destination of the CTU, send an indication to the CTU controller of the CTU indicating that the autonomous vehicle is unable to accept a request to transfer the CTU to the destination.

21. The autonomous vehicle of claim 20, wherein the vehicle controller is configured to receive information of a characteristic relating to transport of the CTU, including one or some combination of: information relating to a characteristic of cargo carried by the CTU, information relating to a characteristic of the vehicle, and a condition relating to travel of the CTU, and wherein the vehicle controller is configured to determine whether the autonomous vehicle is able to transfer the CTU to the destination of the CTU further based on the information of the characteristic relating to transport of the CTU.

22. The autonomous vehicle of claim 20, wherein the vehicle controller is configured to send the indication to a network address of the CTU controller.

\* \* \* \* \*